US007198284B2

(12) United States Patent
Cerreto et al.

(10) Patent No.: US 7,198,284 B2
(45) Date of Patent: Apr. 3, 2007

(54) ADJUSTABLE PERSONAL MOBILITY AID

(75) Inventors: Matthew Robert Cerreto, Oberlin, OH (US); Edward B. Roth, Rocky River, OH (US); James H. Molnar, Bedford, OH (US)

(73) Assignee: Invacare Corporation, Elyria, OH (US)

( * ) Notice: Subject to any disclaimer, the term of this patent is extended or adjusted under 35 U.S.C. 154(b) by 313 days.

(21) Appl. No.: 10/819,539

(22) Filed: Apr. 7, 2004

(65) Prior Publication Data

US 2005/0236813 A1 Oct. 27, 2005

(51) Int. Cl.
*B62B 7/08* (2006.01)

(52) U.S. Cl. ........................ 280/650; 280/649; 403/388

(58) Field of Classification Search ............. 280/47.38, 280/642, 647, 649, 650; 403/388, 384
See application file for complete search history.

(56) References Cited

U.S. PATENT DOCUMENTS

| | | | | | |
|---|---|---|---|---|---|
| 575,631 | A | * | 1/1897 | Bush | 403/217 |
| 4,542,915 | A | * | 9/1985 | Wheeler et al. | 280/642 |
| 4,779,885 | A | * | 10/1988 | Zinn | 280/304.1 |
| 4,919,379 | A | * | 4/1990 | Goetz | 24/521 |
| 4,989,890 | A | | 2/1991 | Lockard et al. | |
| 5,020,816 | A | | 6/1991 | Mulholland | |
| 5,360,224 | A | | 11/1994 | Geiger et al. | |
| 5,409,247 | A | | 4/1995 | Robertson et al. | |
| 5,560,627 | A | * | 10/1996 | Zatulovsky et al. | 280/42 |
| 5,593,174 | A | * | 1/1997 | Graziano et al. | 280/647 |
| 5,667,235 | A | | 9/1997 | Pearce et al. | |
| 5,743,545 | A | | 4/1998 | Kunze et al. | |
| 5,797,697 | A | * | 8/1998 | Keller | 403/384 |
| 6,123,482 | A | * | 9/2000 | Keller | 403/384 |
| 6,224,156 | B1 | * | 5/2001 | Fleigle | 297/354.1 |
| 6,227,559 | B1 | | 5/2001 | Slagerman et al. | |
| 6,929,275 | B1 | * | 8/2005 | Schlangen | 280/250.1 |
| 6,932,369 | B2 | * | 8/2005 | Walsh et al. | 280/250.1 |

* cited by examiner

*Primary Examiner*—Jeff Restifo
(74) *Attorney, Agent, or Firm*—Calfee, Halter & Griswold, LLP

(57) ABSTRACT

A mobility aid, such as a wheelchair or walker, includes first and second structural members and a fastener for connecting the members together. A washer has first and second portions connected by a bridge portion, each with a fastener opening for receiving the fastener. The washer is self-supporting on a structural member to take the place of two individual washers. A method of connecting first and second connecting members to a frame member of a personal mobility aid includes placing a washer on the frame member so that the washer has first and second portions spaced apart on opposite sides of the frame member; placing the first and second connecting members adjacent the first and second portions of the washer; and fastening the connecting members and the frame member and the washer together with a fastener.

37 Claims, 5 Drawing Sheets

ADJUSTABLE PERSONAL MOBILITY AID

FIELD OF INVENTION

The present invention relates generally to personal mobility aids, and in particular, to a personal mobility aid with adjustable structural members that are easily adjusted through the use of a washer.

BACKGROUND OF THE INVENTION

Mobility aids such as wheelchairs and walkers are used by a significant portion of society. These mobility aids provide an important function for those they assist. In order to effectively serve this function, however, a mobility aid must be appropriately sized for the individual it is assisting.

Manufacturers of mobility aids address this requirement by making their mobility aids adjustable. A common approach is to provide multiple locations on a given structural member of the mobility aid where another member may attach. In this manner, a user can change the structural dimensions of the mobility aid by adjusting the attachment locations of various structural members.

As an example, two or more structural members of a device may be attached by fasteners (such as bolts) which fit within corresponding fastener openings on the structural members. Additional fastener openings on one or both of the structural members provide alternative coupling locations between the structural members. Changing fastener openings modifies the position of the members relative to one another, thus changing the dimensions of the device.

A drawback of this simple approach is the cumbersome nature of the process. To change fastener openings on the structural members, the user must disassemble and remove the fasteners, usually a nut-bolt-washer combination. Often, multiple fasteners must be removed to facilitate the change. Once this is accomplished, the user must align the desired fastener openings on the corresponding members, hold the various parts and the structural members in place, and insert and reassemble the fasteners. A common result is for a washer to slip out of alignment or fall out of the assembly during the process.

SUMMARY OF INVENTION

In one aspect, the present invention relates to a personal mobility aid and/or to a washer for use therein. The mobility aid includes first and second structural members and a fastener for connecting the first and second members together. Further, the mobility aid includes a washer which has first and second portions connected by a bridge portion. The first and second portions each have a fastener opening for receiving the fastener.

In another aspect of the invention, a method of connecting first and second connecting plates to a frame member of a personal mobility aid includes the steps of placing a washer on the frame member so that the washer has first and second portions spaced apart on opposite sides of the frame member; placing the first and second connecting plates adjacent the first and second portions of the washer; and fastening the connecting plates and the frame member and the washer together with a fastener.

DETAILED DESCRIPTION OF ILLUSTRATED EMBODIMENTS

In the accompanying drawings, which are incorporated in and constitute a part of the specification, embodiments of the invention are illustrated, which, together with the detailed description given below, serve to exemplify the principles of this invention. The invention is not limited by the fact that certain embodiments are illustrated, but rather is broader in scope, as shown in the appended claims.

Figure 1:
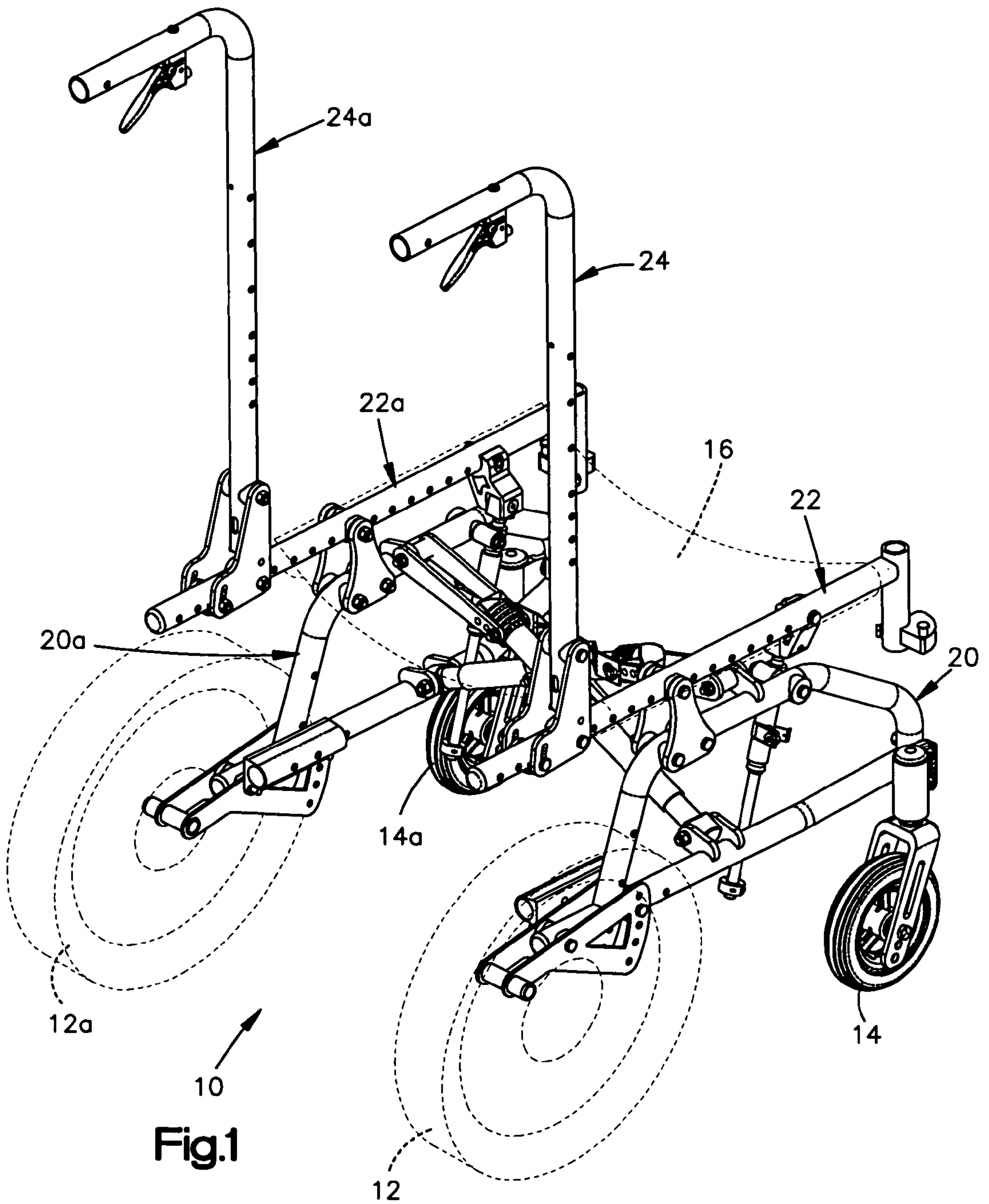
FIG. 1 is a perspective view of a mobility aid of the present invention.

FIG. 1 shows a mobility aid 10 in accordance with one embodiment of the present invention. The mobility aid 10 is a wheelchair that includes a plurality of interconnected structural members. The wheelchair 10 includes a plurality of frame members, first and second rear wheels 12 and 12*a,* first and second front casters 14 and 14*a,* a seat 16, and a plurality of connecting plates, fasteners, and washers (identified below in detail). In the embodiment illustrated in FIG. 1, the frame members of the mobility aid 10 include first and second side frames 20 and 20*a,* first and second seat rails 22 and 22*a,* and first and second back tubes 24 and 24*a*. Other mobility aids with which the present invention is associated may have a different type of frame and so may include different structural members.

The first and second rear wheels 12 and 12*a* engage the ground surface for rolling and are adjustably coupled to the rear section of the first and second side frame 20 and 20*a,* respectively. The first and second front casters 14 and 14*a* also engage the ground surface for rolling and are supported on the front section of first and second side frames 20 and 20*a,* respectively. The first and second side frames 20 and 20*a* are, themselves, adjustably coupled to the first and second seat rails 22 and 22*a,* respectively. Additionally, the first and second back tubes 24 and 24*a* are also adjustably coupled to the first and second seat rails 22 and 22*a,* respectively.

In the mobility aid 10 shown in FIG. 1, the structural members that are adjustably coupled to each other are coupled by a plurality of connecting members in the form of connecting plates; a plurality of fasteners 70; and a plurality of washers 30. In accordance with the present invention, the design of the washers 30 allows for easy adjustment of the coupling between structural members. (Other embodiments of the invention may or may not include connecting members, or other types of structural members. Alternatively, a connecting member in some embodiments be considered as a structural member. Additionally, as noted below, washers of the present invention may take differing forms, including those illustrated and others not shown.)

FIGS. 6–9 illustrate a first embodiment of a washer 30 in accordance with the invention. The washer 30 has a generally U-shaped configuration including a first arm or first portion 32 with a first fastener opening 34; a second arm or second portion 36 with a second fastener opening 38; and a base or bridge portion 40 that extends between and interconnects the first and second portions. The first portion 32 has an inner surface 42 and an outer surface 44. The second portion 36 has an inner surface 46 and an outer surface 48. The bridge portion 40 has an inner surface 50 and an outer surface 52. As a result of the U-shaped configuration of the washer 30, with the bridge portion 40 connecting the first portion 32 to the second portion 36, the washer has an open end 54 and a closed end 56.

In the preferred embodiment of the invention, the bridge portion 40, the first portion 32, and the second portion 36 are formed as one piece. In other embodiments, the washer portions 32, 36 and 40 might be formed separately and joined to each other to form the completed washer 30. The bridge portion 40 of the washer 30 connects the first portion 32 to the second portion 36 in an orientation such that the first portion and the second portion are spaced apart from and extend generally parallel to each other. In this arrangement, the washer 30 has the generally U-shaped configuration and the first and second fastener openings 34 and 38 are co-axial.

Figure 5A:
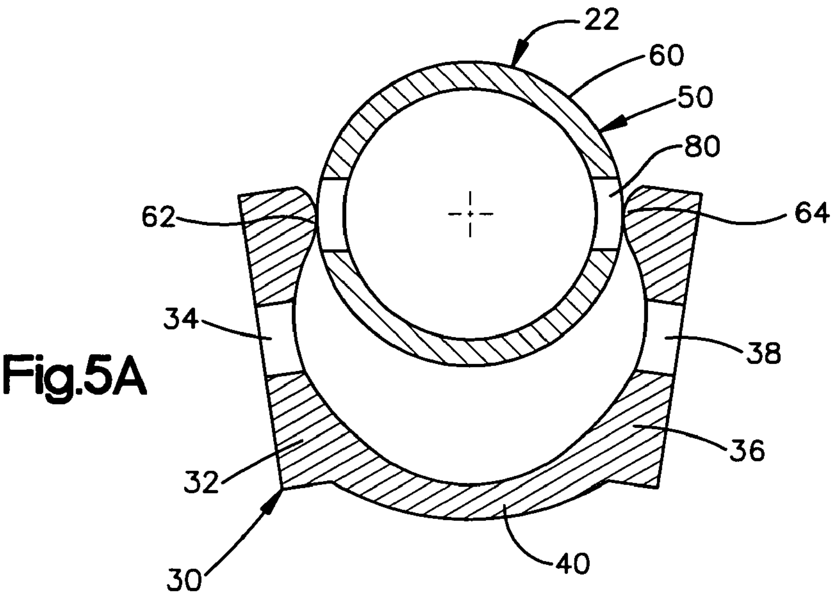
FIGS. 5A–5C are cross-sectional views of a connection between structural members of the present invention.
Figure 5B:
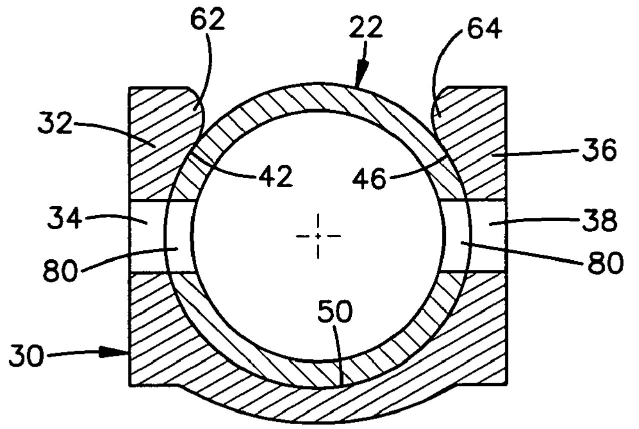
Figure 5C:
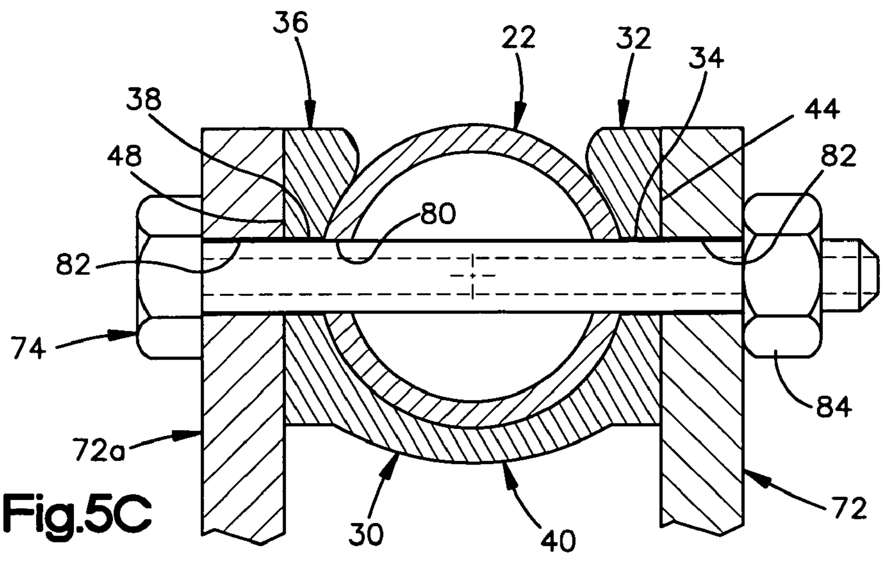
Figure 6:
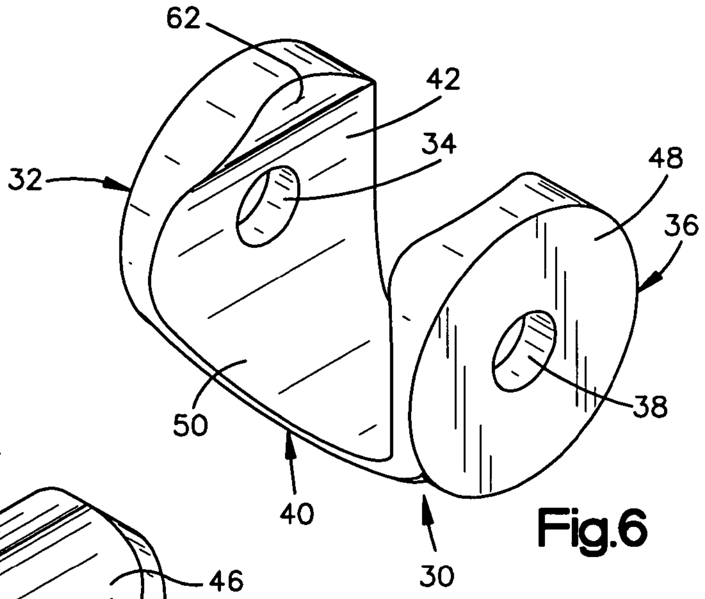
FIGS. 6 to 9 are two perspective views, a front view, and a side view, respectively, of a first embodiment of a washer of the present invention.
Figure 7:
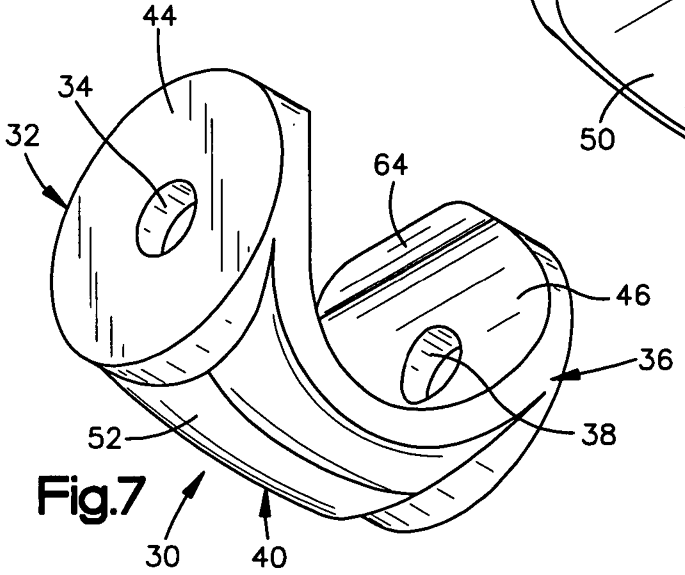
Figure 8:
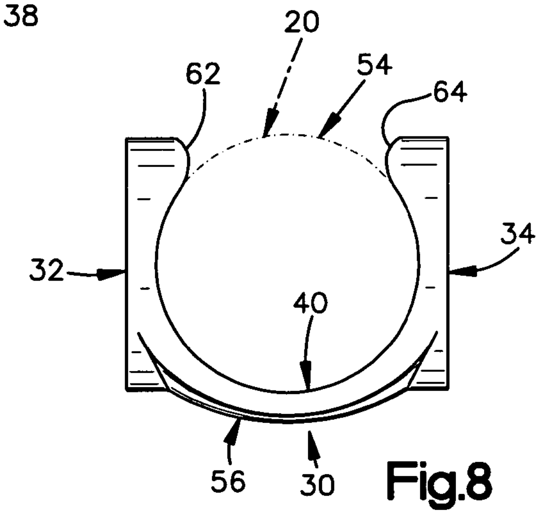
Figure 9:
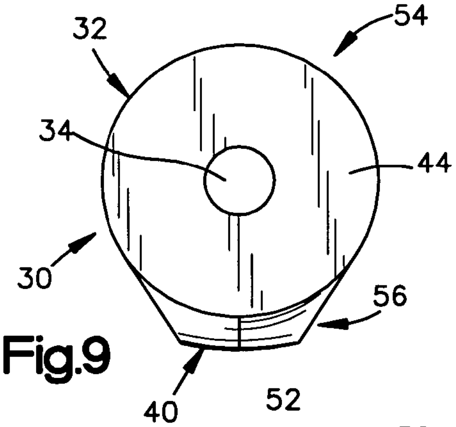

In accordance with the invention, the first portion 32 of the washer 30 and the second portion 36 of the washer can be positioned on opposite sides of a structural member of a mobility aid, thereby to locate and support the washer on the structural member. FIG. 5A and FIG. 5B illustrate the positioning of an exemplary washer 30 on an exemplary structural member 22.

As shown in FIG. 5A, in the preferred embodiment of the washer 30, the first portion 32 and the second portion 36 of the washer 30 are resiliently movable relative to each other in a direction toward and away from each other. This resiliency allows the washer 30 to be removably attached to the structural member 22 by snapping the washer onto the structural member. When the washer 30 is moved onto the structural member 22, the first portion 32 and the second portion 36 are forced to spread apart. When the washer 30 is far enough on the structural member 22 that the first lip 62 and the second lip 64 are past the center of the structural member, the resiliency of the washer returns the first portion and the second portion toward, but not to, a free state position. Thus, the first lip 62 and the second lip 64 helps to make the washer 30 self-supporting on the structural member 22. The washer 30 can, alternatively, be placed on an open end of a structural member and be slid longitudinally into position.

The inner surfaces 42, 46 and 50 of the washer 30 form a continuous inner surface that abuttingly engages an outer surface 60 of the structural member 22 once the washer is in place on the structural member. Further, the first portion 32 and the second portion 36 of the washer 30 have portions that are spaced apart a distance less than the width of the structural member 22 when the washer is in a free state. In the most preferred embodiment, the portions that are spaced apart a distance less than the width of the structural member are the first lip 62 and the second lip 64 at the washer open end 54. This dimensioning of the washer 30 enables the snapping-on motion described above, and also enables the self-retention of the washer on the structural member 22.

Because the washer 30 is self-supporting on the structural member 22, assembly and disassembly and adjustment of the coupled parts of the mobility aid 10 are substantially easier. The washer 30 (or two separate washers) need not be held in position while a fastener, such as a bolt, is used to fasten the parts together. The characteristics of the washer 30 that are desirable include inexpensive manufacture cost, resiliency, durability, and light weight. Nylon plastic (DSM 1821-A or equivalent) is the preferred material to meet these characteristics, although other materials are certainly suitable.

Figure 2:
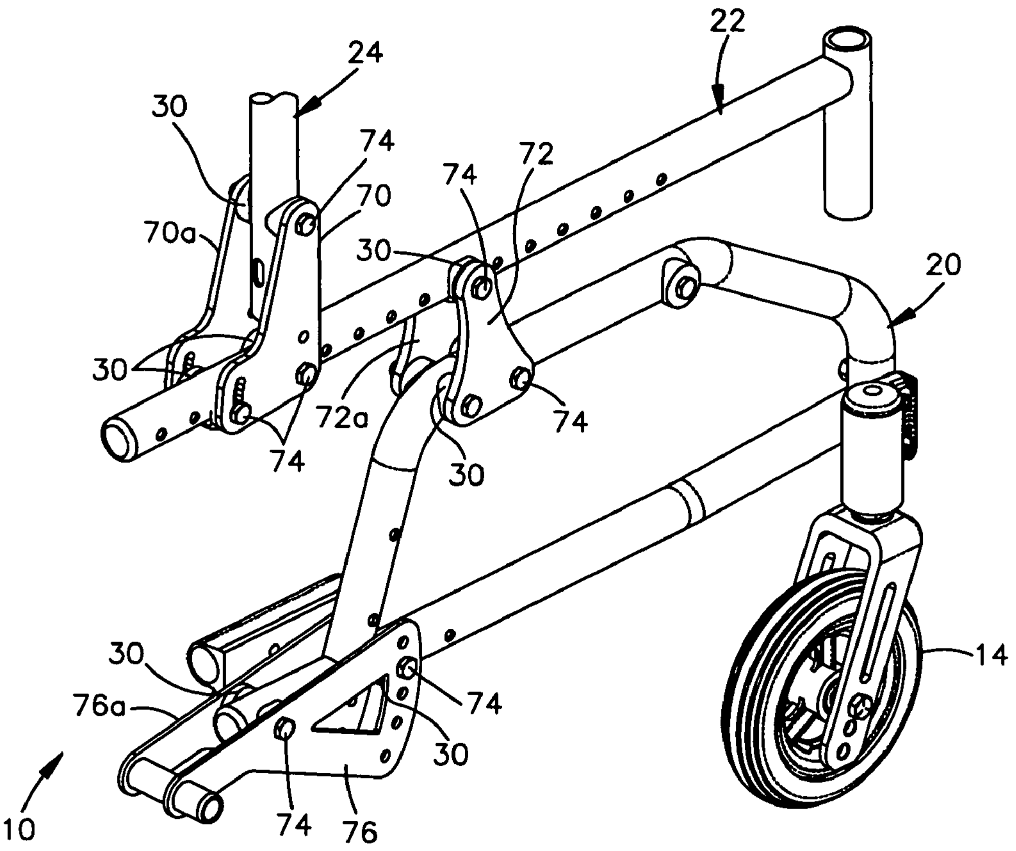
FIG. 2 is a detailed view of the right-hand section of the mobility aid of the present invention.
Figure 3:
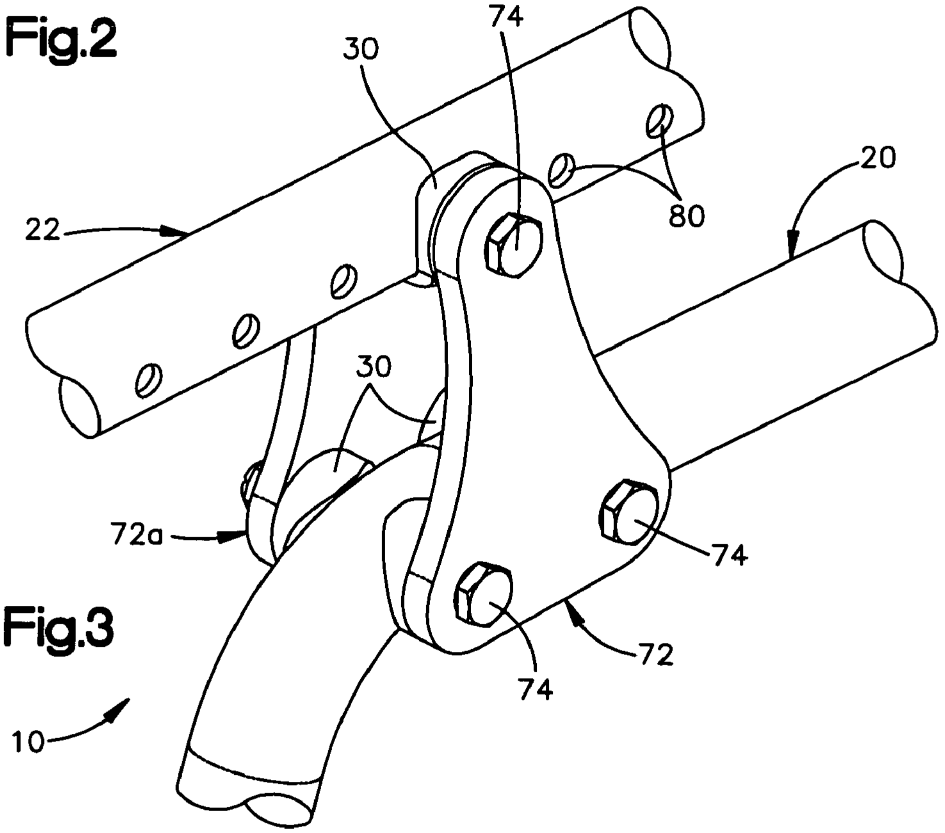
FIG. 3 is a close-up view of a connection between structural members of the present invention.
Figure 4:
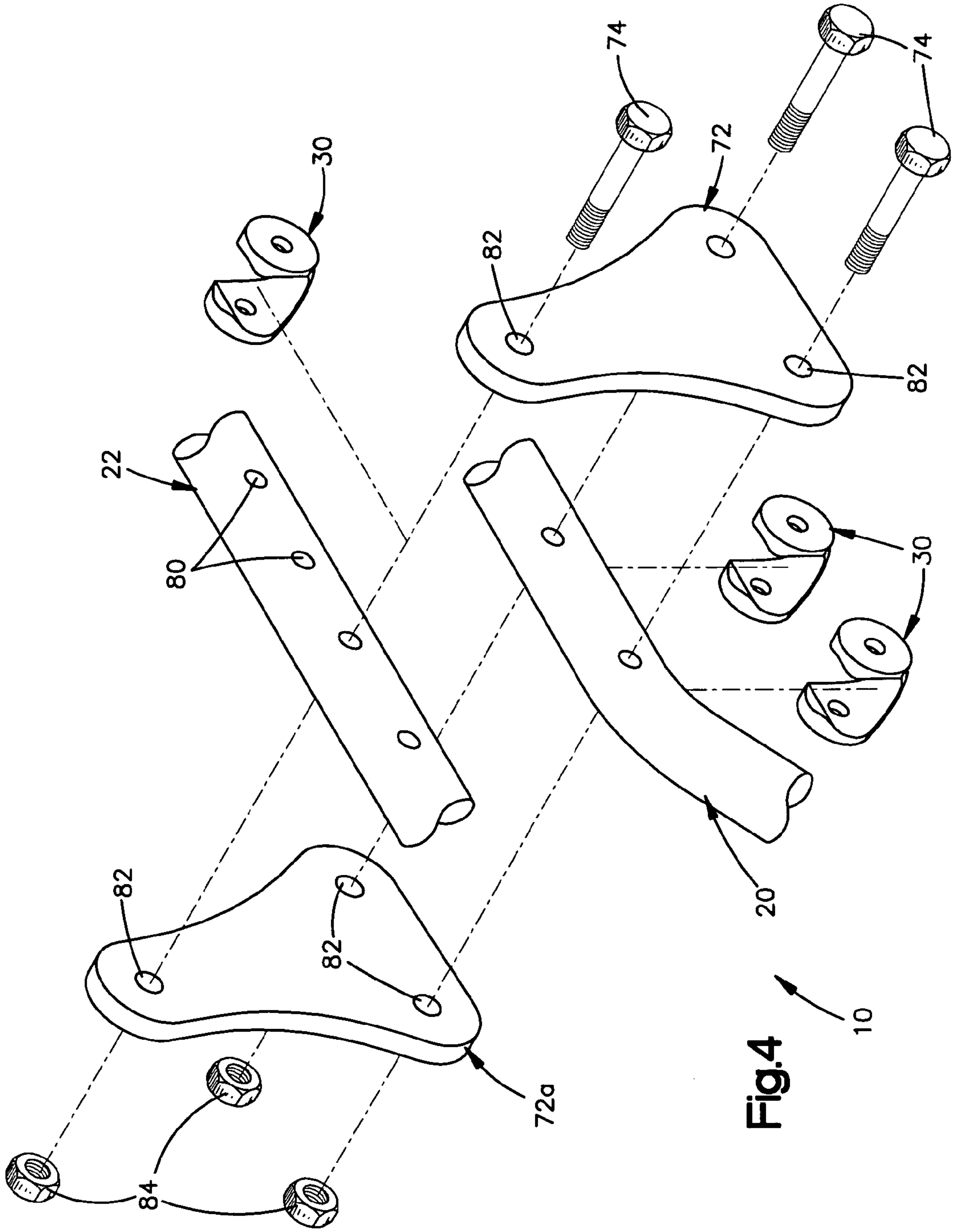
FIG. 4 is an exploded view of a connection between structural members of the present invention.

The specific wheelchair 10 that is shown in FIG. 1 includes six adjustable connections or couplings between structural members; three on the right side and three on the left side. FIG. 2 illustrates on an enlarged scale the three adjustable connections on the right side of the mobility aid 10, which are similar to and thus representative of the connections on the left side of the mobility aid. The first back tube 24 is adjustably coupled to the first seat rail 22 by first and second right angle back plates 70 and 70*a,* and multiple fasteners (bolts) 74 and washers 30. Similarly, the first seat rail 22 is adjustably coupled to the first side frame 20 by first and second right frame plates 72 and 72*a* and multiple fasteners (bolts) 74 and washers 30. Finally, first and second right rear axle plates 76 and 76*a* are adjustably coupled to the first side frame by multiple fasteners (bolts) 74 and washers 30.

Because the several adjustable couplings in the wheelchair 10 are similar to each other in construction and operation, the connection between the first seat rail 22 and the first side frame 20 will be described as exemplary. The first seat rail 22 is positioned above and generally parallel to the first side frame 20. The first seat rail 22 has a plurality of fastener openings 80 spaced apart along the length of the seat rail. Each fastener opening 80 on the first seat rail 22 serves as an alternative location at which the first side frame 20 can attach, to adjustably couple the two structural members to each other.

The washer 30 is positioned on the first seat rail 22 at a location so that the first fastener opening 34 and the second fastener opening 38 in the washer align with a selected fastener opening 80 in the first seat rail. In a similar manner, two additional washers 30 are positioned at spaced locations on the first side frame 20 such that their fastener openings are aligned with fastener openings on the first side frame.

The first frame plate 72 and the second frame plate 72*a* are positioned to abuttingly engage the outer surface 44 of the first portion 32 of the washer 30 and the outer surface 48 of the second portion 36 of the washer, respectively. Fastener openings 82 on the first frame plate 72 and the second frame plate 72*a* are aligned with the first fastener opening 34 and the second fastener opening 38 of the washer 30. A fastener 74 is inserted through the aligned fastener openings. The fastener 74 extends through the fastener opening 82 in the first frame plate 72; the fastener opening 34 in the first portion 32 of the washer 30; the pair of fastener openings 80 on opposite sides of the seat rail 22; the fastener opening 38 in the second portion 36 of the washer; and the fastener opening 82 in the second frame plate 72*a*. The fastener 74 is secured in position by a nut 84. All this is done while the washer 30 is supporting itself on the seat rail 22.

Figure 10:
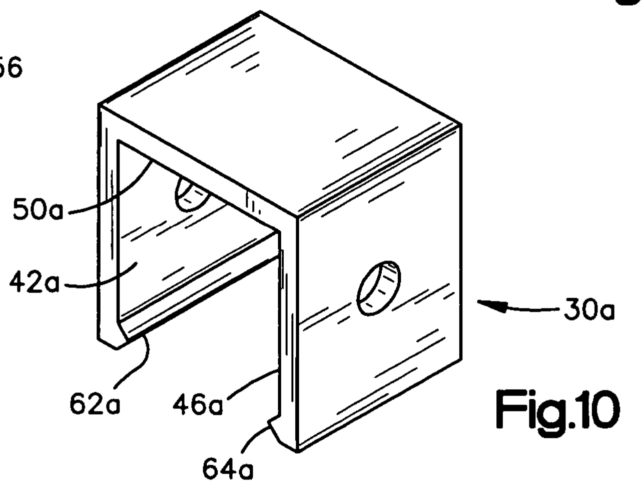
FIG. 10 is a perspective view of a second embodiment of a washer of the present invention.

FIG. 10 illustrates a washer 30*a* in accordance with a second embodiment of the invention. The washer 30*a* is adapted to engage a square or rectangular structural member, rather than a round one. Thus, in the washer 30*a,* the bridge portion inner surface 50*a,* the first portion inner surface 42*a,* and the second portion inner surface 46*a* are substantially flat so as to abuttingly engage a structural member with a flat outer surface. Ridges 62 and 64*a* on the washer 30*a,* similar in function to the lips 62 and 64 of the washer 30, make the washer 30*a* self-supporting on a structural member.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the washer can be made from a variety of materials; the mobility aids utilizing the washers can vary in type (e.g. wheelchairs, crutches, walkers, rollators) and configuration (e.g. motorized, manual, sport); the washer can be designed to fit structural elements in a variety of sizes and shapes (e.g. round, oval, rectangular, square). Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A personal mobility aid comprising:

a first structural member;

a second structural member;

a fastener for connecting the first and second structural members; and a washer;

said washer having a first portion with a first fastener opening for receiving the fastener, a second portion with a second fastener opening for receiving the fastener, and a bridge portion connecting said first and second portions;

said washer being disposed between said first and second structural members and having a cylindrical first surface for engaging a cylindrical one of said first and second structural members and a non-cylindrical second surface for engaging a non-cylindrical one of said first and second structural members;

the bridge portion of said washer connecting only said first and second portions of said washer and not connecting any structural members of said personal mobility aid.

2. A mobility aid as set forth in claim 1 wherein said first and second portions of said washer and said bridge portion of said washer are formed as one piece.

3. A mobility aid as set forth in claim 1 wherein said first and second portions of said washer each have a curved inner surface engaging one of said first and second structural members.

4. A mobility aid as set forth in claim 1 wherein said first and second portions of said washer each have a flat inner surface engaging one of said first and second structural members.

5. A mobility aid as set forth in claim 1 wherein said washer is self-supporting on one of said first and second structural members.

6. A mobility aid as set forth in claim 5 wherein said first and second portions of said washer are resiliently movable relative to each other enabling said washer to be removably attached to one of said first and second structural members.

7. A mobility aid as set forth in claim 1 wherein said first and second portions of said washer have portions spaced apart by a distance less than the width of one of said first and second structural members when said washer is in a free state.

8. A mobility aid as set forth in claim 7 wherein said spaced apart portions are lips on said first and second portions of said washer.

9. A mobility aid as set forth in claim 1 wherein said washer has a continuous curved inner surface for abuttingly engaging one of said first and second structural members, and said one of said structural members has a corresponding curved outer surface.

10. A mobility aid as set forth in claim 1 wherein said washer has a generally U-shaped configuration.

11. A mobility aid as set forth in claim 1 wherein said first fastener opening and said second fastener opening are coaxial.

12. A mobility aid as set forth in claim 1 wherein said mobility aid is a wheelchair with adjustable structural members.

13. A personal mobility aid comprising:

a frame member;

first and second connecting plates located on opposite sides of the frame member;

at least one fastener for fastening said frame member and said first and second connecting plates; and at least one washer engaging said first frame member and said first and second connecting plates;

said at least one washer having a first portion located between said frame member and said first connecting plate and a second portion located between said frame member and said second connecting plate;

said washer first portion having a cylindrical surface for engaging said frame member and a non-cylindrical surface for engaging said first connecting plate;

said washer second portion having a cylindrical surface for engaging said frame member and a non-cylindrical surface for engaging said second connecting plate;

the bridge portion of said washer connecting only said first and second portions of said washer and not connecting any structural members of said personal mobility aid.

14. A mobility aid as set forth in claim 13 wherein said washer includes a bridge portion connecting said first and second portions of said washer.

15. A mobility aid as set forth in claim 13 wherein said first and second portions have a curved inner surface engaging said frame member.

16. A mobility aid as set forth in claim 13 wherein said first and second portions have a flat inner surface engaging said frame member.

17. A mobility aid as set forth in claim 13 wherein said washer is self-supporting on said frame member.

18. A mobility aid as set forth in claim 17 wherein said first and second portions are resiliently movable relative to each other enabling each washer to be removably attached to said frame member.

19. A mobility aid as set forth in claim 13 wherein said washer has a generally U-shaped configuration.

20. A mobility aid as set forth in claim 13 wherein said first fastener opening and said second fastener opening are coaxial.

21. A mobility aid as set forth in claim 13 wherein said mobility aid is a wheelchair with adjustable frame members.

22. A method of connecting first and second connecting members to a frame member of a personal mobility aid having a plurality of fastener openings that are spaced apart along the length of the frame member for enabling adjustment of the mobility aid, said method comprising the steps of:

placing a washer on the frame member so that the washer has first and second portions with respective first and second fastener openings spaced apart on opposite sides of a first selected one of the plurality of fastener openings in the frame member;

placing the first and second connecting members adjacent the first and second portions of the washer; and fastening the connecting members and the frame member and the washer together with a fastener that extends through the first and second connecting members and through the first and second fastener openings in the washer and through the first selected fastener opening in the frame member.

23. A method as set forth in claim 22 wherein said step of placing a washer on the frame member includes resiliently deforming the washer so that first and second portions can be moved into position on opposite sides of the frame member.

24. A method as set forth in claim 22 wherein said step of placing a washer on the frame member includes snapping the washer onto the frame member.

25. A method as set forth in claim 22 wherein each one of the first and second portions of the washer has a curved inner surface engaging the frame member.

26. A method as set forth in claim 22 wherein each one of the first and second portions of the washer has a flat inner surface engaging the frame member.

27. A method as set forth in claim 22 wherein the washer is self-supporting on the frame member.

28. A method as set forth in claim 22 wherein the first and second portions of the washer have portions spaced apart by a distance less than the width of the frame member when said washer is in a free state.

29. A method as set forth in claim 22 wherein the mobility aid is a wheelchair with adjustable frame members.

30. A method as set forth in claim 22 further comprising the steps of:

removing the fastener from the connecting members and from the washer and from the first selected opening in the frame member;

moving the washer along the frame member without removing it from the frame member to a new position in which the first and second fastener openings of the washer overlie a second selected one of the plurality of fastener openings in the frame member; and extending the fastener through the first and second connecting members and through the first and second fastener openings in the washer and through the second selected fastener opening in the frame member;

whereby the position of the connecting members is adjusted relative to the frame member.

31. A method as set forth in claim 22 wherein the step of placing a washer on the frame member includes placing a washer that wraps around the frame member so as to be self-supporting on the frame member during sliding movement along the frame member without removal from the frame member.

32. A personal mobility aid comprising:

a plurality of frame members including:

first and second seat rails, first and second back tube, each back tube coupled to one seat rails, first and second side frame, each side frame couple to one seat rails, first and second rear wheel, each rear wheels coupled to one side frame, first and second front wheels, each front wheel rotatably couple to one side frame, and a plurality of fasteners and U-shaped washers for coupling the frame members to each other, each washer having a first portion with a first fastener opening for receiving one of said fasteners, a second portion with a second fastener opening for receiving said one of said fasteners, and a bridge portion connecting the first and second portions, wherein the first and second portions and bridge portion have a continuous curved inner surface for abuttingly engaging one of said plurality of frame members, said one frame member having a corresponding curved outer surface;

each U-shaped washer having a cavity that receives one of said plurality of frame members, said washer being free of portions extending from said bridge portion in a direction away from said cavity of said washer.

33. A mobility aid as set forth in claim 32 wherein each of said plurality of washers is self-supporting on said frame member.

34. A mobility aid as set forth in claim 33 wherein for each one of said plurality of washers said first and second portions are resiliently movable relative to each other enabling each one of said plurality of washers to be removably attached to said frame member.

35. A mobility aid as set forth in claim 32 wherein said first and second portions have portions spaced apart by a distance less than the width of said frame member when said washer is in a free state.

36. A mobility aid as set forth in claim 32 wherein said mobility aid is a wheelchair with adjustable frame members.

37. A personal mobility aid comprising:

a frame member having a plurality of fastener openings that are spaced apart along the length of the frame member;

first and second connecting plates located on opposite sides of the frame member;

at least one fastener for fastening said frame member and said first and second connecting plates; and at least one washer engaging said first frame member and said first and second connecting plates;

said at least one washer having a first portion with a first fastener opening located between the frame member and said first connecting plate and a second portion with a second fastener opening located between said frame member and said second connecting plate;

when the personal mobility aid is in a first position of adjustment the fastener extending through the first and second connecting members and through the first and second fastener openings in the washer and through a first selected one of the plurality of fastener openings in the frame member;

the fastener being removable from the first selected one of the plurality of fastener openings, and the first and second connecting members and washer being movable along the frame member without the washer being removed from the frame member, to a second selected one of the plurality of fastener openings for receiving the fastener there through whereby the personal mobility aid is placed in a second position of adjustment.

* * * * *